June 8, 1943. J. A. TAYLOR 2,321,113
REFRIGERATION
Filed Sept. 17, 1941
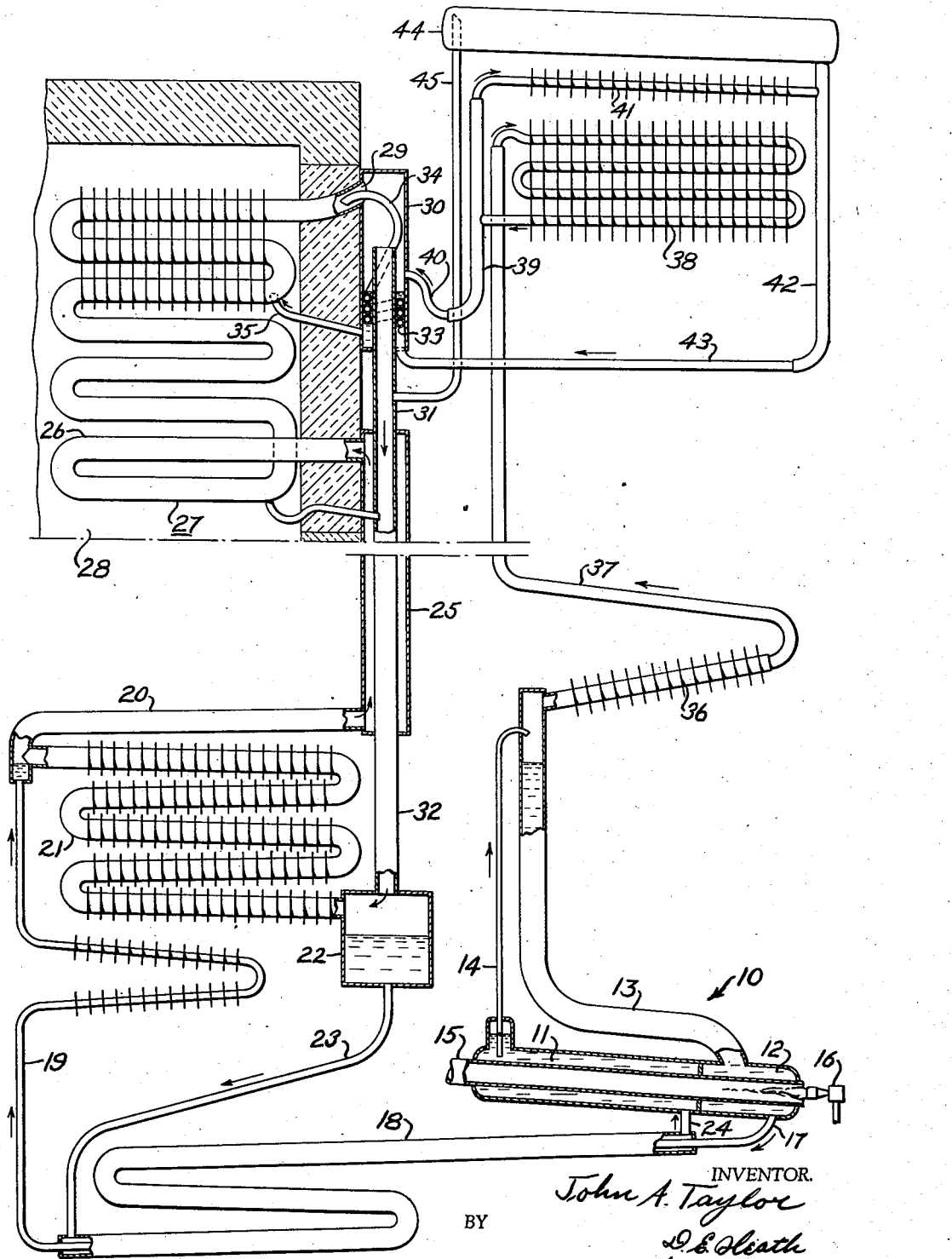
INVENTOR.
John A. Taylor
BY
D. E. Heath
his ATTORNEY Patented June 8, 1943

2,321,113

UNITED STATES PATENT OFFICE 2,321,113

REFRIGERATION

John A. Taylor, Evansville, Ind., assignor to Servel, Inc., New York, N. Y., a corporation of Delaware Application September 17, 1941, Serial No. 411,094

7 Claims. (Cl. 62—179)

My invention relates to refrigeration and more particularly to a refrigeration system employing evaporation of refrigerant fluid in the presence of inert gas, the liquid refrigerant fluid being supplied by a plurality of condensers or condenser sections and brought into the presence of the inert gas at different elevations. It is an object of the invention to carry out precooling of liquids from both condensers.

The single figure of the drawing shows more or less diagrammatically a refrigeration system embodying the invention. A generator 10 has a horizontal portion divided into chambers 11 and 12. The lower end of a stand pipe 13 is connected to chamber 12. The lower end of a vapor liquid lift conduit 14 projects downward into generator chamber 11. The upper end of conduit 14 is connected to the upper part of stand pipe 13. Within generator chambers 11 and 12 is a flue 15. A gas burner 16 is arranged so that its flame is projected into the lower end of flue 15.

Generator chamber 12 is connected by a conduit 17, a liquid heat exchanger, and a conduit 19 and the lower end of a conduit 20 to the upper end of an absorber coil 21. The lower end of absorber coil 21 is connected to an absorber vessel 22. The bottom of absorber vessel 22 is connected by a conduit 23, liquid heat exchanger 18, and a conduit 24 to generator chamber 11.

The upper end of absorber coil 21 is connected by a conduit 20, the outer passage of gas heat exchanger 25, and a conduit 26 to the lower end of an evaporator coil 27. The evaporator coil 27 is located in a thermally insulated refrigerator storage compartment 28. The upper end of evaporator coil 27 is connected by a conduit 29, a vessel 30, a conduit 31, the inner passage of gas heat exchanger 25, and conduit 32 to the top of absorber vessel 22.

Conduit 31 projects upward inside of vessel 30. In the lower part of vessel 30 there is a pipe coil 33. The upper end of pipe coil 33 is connected by a conduit 34 to the upper end of evaporator coil 27. The lower part of vessel 30 is connected by a conduit 35 to an intermediate part of evaporator coil 27.

The top of stand pipe 13 is connected by a rectifier 36, and a conduit 37 to the upper end of an air-cooled condenser coil 38. The lower end of condenser coil 38 is connected by a part of conduit 39 and a conduit 40 to vessel 30. The upper end of conduit 39 is connected to the upper end of a second condenser 41. The other end of condenser 41 is connected by a part of conduit 42 and a conduit 43 to the lower end of pipe coil 33 in vessel 30. The upper end of conduit 42 is connected to a storage vessel 44. The other end of vessel 44 is connected by a conduit 45 to conduit 31 in the gas circuit.

The above described system contains a solution of refrigerant fluid in an absorption liquid such as a water solution of ammonia, and an auxiliary pressure equalizing fluid such as hydrogen gas. When burner 16 is lighted so that heat is applied to the generator 10, ammonia vapor is expelled from solution in generator chambers 11 and 12. Ammonia vapor expelled from solution in chamber 12 rises through stand pipe 13. Vapor expelled from solution in chamber 11 rises through vapor lift conduit 14 carrying with it liquid from chamber 11 into the upper end of stand pipe 13.

Weakened absorption liquid flows from generator chamber 12 through conduit 17, liquid heat exchanger 18, conduit 19, and the lower end of conduit 20 into the upper end of an absorber coil 21. Liquid flows downward to the absorber coil 21 absorbing into solution ammonia vapor in the absorber. Enriched absorption liquid flows from absorber vessel 22 through conduit 23, liquid heat exchanger 18, and conduit 24 into generator chamber 11.

Ammonia vapor flows from the upper end of stand pipe 13 through rectifier 36, and conduit 37 into the upper end of condenser 38. The vapor condenses to liquid in condenser 38. The liquid flows from the lower end of condenser 38 through a part of conduit 39, conduit 40, vessel 30 and conduit 35 into evaporator 27. Any uncondensed vapor from condenser 38 flows from the lower end thereof through conduit 39 into the upper end of the second condenser 41. Condensate from condenser 41 flows through conduit 42, conduit 43, coil 33, and conduit 34 into the upper end of evaporator 27. Liquid refrigerant flows downward in evaporator 27 evaporating and diffusing into the hydrogen atmosphere, producing a refrigerating effect for cooling the refrigerator storage compartment 28. The gas flows from the upper end of evaporator 27 through conduit 29 into vessel 30. Gas flows from vessel 30 through conduit 31, gas heat exchanger 25, and conduit 32 into the absorber vessel 22. Gas flows from the upper end of absorber 21 through conduit 20, gas heat exchanger 25, and conduit 26 into the lower end of evaporator 27. Liquid from the first condenser section 38 which enters vessel 30 through conduit 40 flows over the outside of coil 33. This liquid is cooled by evaporation and diffusion into gas in vessel 30. This also produces cooling of liquid in coil 33 which is on its way to the evaporator from the upper condenser section 41 as described.

Various changes and modifications may be made within the scope of the invention as set forth in the following claims.

What is claimed is:

1. A refrigeration system employing evaporation of refrigerant fluid in the presence of inert gas and having an inert gas circuit including an evaporator and an absorber, a plurality of condensers connected to deliver liquid to said evaporator at different parts thereof, the liquid flowing from the several condenser sections coming into mutual heat exchange relation, and the liquid flowing from one of said condenser sections evaporating in the presence of gas from said circuit between said evaporator and absorber and thereby cooling itself and all the liquid flowing to said evaporator due to said heat transfer relationship.

2. A refrigeration system employing evaporation of refrigerant fluid in the presence of inert gas and having a circuit for inert gas including an evaporator and an absorber, a condenser, conduits for conducting liquid from different parts of said condenser to different parts of said evaporator, said conduits coming into mutual heat exchange and one of said conduits holding liquid in the presence of gas in said circuit between said evaporator and said absorber thereby cooling by evaporation takes place both of the liquid itself and the liquid with which it is in heat exchange relation.

3. An absorption refrigeration system of the type employing evaporation of refrigerant fluid in the presence of inert gas and having a circuit for inert gas including a plurality of evaporator sections and an absorber, a plurality of condenser sections, a chamber in said circuit in the path of flow of gas from said evaporator section to said absorber, a conduit for conducting liquid from one of said condenser sections to one of said evaporator sections and including said chamber, and a conduit for conducting liquid from another of said condenser sections to another of said evaporator sections and having a part located in said chamber.

4. A refrigeration system employing evaporation of refrigerant fluid in the presence of inert gas and having a circuit for inert gas including a plurality of evaporator sections and an absorber, a plurality of condenser sections, a liquid holder in said gas circuit in the path of flow of gas from said evaporator section to said absorber, a conduit for liquid from one of said condenser sections to one of said evaporator sections and including said liquid holder, and a conduit for liquid from another of said condenser sections to another of said evaporator sections and having a part in heat exchange relation with said liquid holder.

5. A method of refrigeration which includes evaporating liquid refrigerant in the presence of inert gas at a plurality of places, forming liquid refrigerant by condensation of vaporous refrigerant at a plurality of places, conducting liquid refrigerant from one of said places of condensation to one of said places of evaporation in a path of flow in which the liquid is brought into the presence of gas flowing away from said places of evaporation and conducting liquid refrigerant from another of said places of condensation to another of said places of evaporation in a path of flow that extends in heat exchange relation with said first path of flow where the liquid in said first path of flow is in the presence of the inert gas.

6. A method of refrigeration by evaporating liquid refrigerant in the presence of inert gas, flowing the resulting mixture of refrigerant vapor and gas into the presence of a quantity of liquid refrigerant, bringing another quantity of liquid refrigerant into heat exchange relation with said first quantity of liquid refrigerant, and separately conducting liquid from both of said quantities of liquid refrigerant into the presence of the gas to carry out said first step of evaporating liquid refrigerant in the presence of the gas.

7. A refrigeration system having a gas circuit including an evaporator, a plurality of condenser sections one above the other, a conduit for liquid from an upper condenser section to an upper part of said evaporator, a conduit for liquid from a lower condenser section to a lower part of said evaporator, said conduits having parts in heat exchange relationship and cooled by evaporation of liquid in one of said parts in the presence of gas leaving said evaporator.

JOHN A. TAYLOR.